Figure 1:
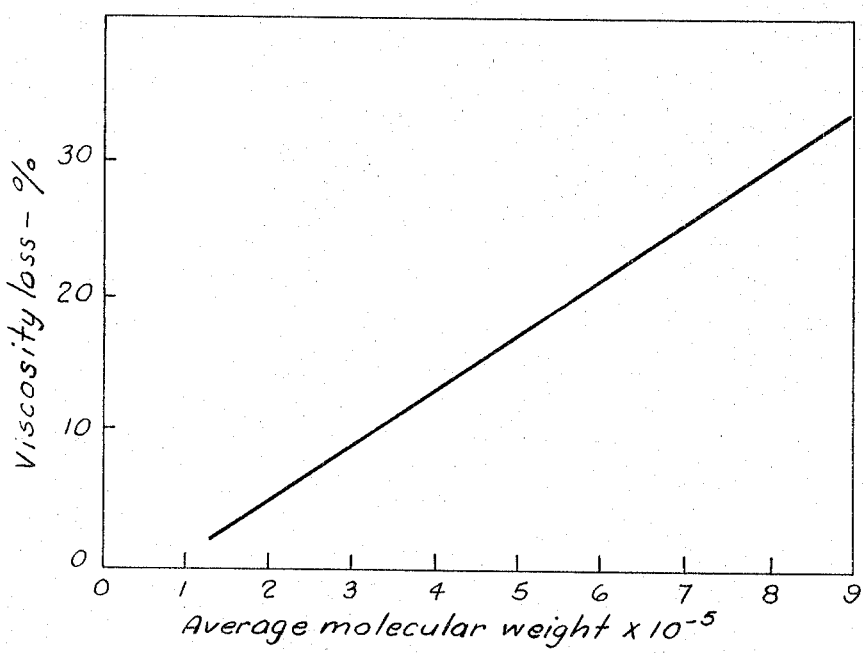

United States Patent Office 3,318,813
Patented May 9, 1967

3,318,813
POLY-ALKYLSTYRENE VISCOSITY INDEX
IMPROVER
Herbert W. McCormick and William R. Nummy, Midland, Mich., assignors to The Dow Chemical Company, Midland, Mich., a corporation of Delaware
Filed Aug. 16, 1965, Ser. No. 483,009
19 Claims. (Cl. 252—59)

This invention relates to an additive for improving the viscosity index of lubricating oils. More particularly, it concerns the use of polymers having a narrow range of molecular weights as a lubricant additive. This application is a continuation-in-part of our copending application Ser. No. 304,071, filed Aug. 23, 1963, now abandoned.

It is common practice in the preparation of lubricating oils to add a minor amount of a high molecular weight polymer such as polyisobutylene, polymethylmethacrylate or the like to enhance the viscosity-temperature relationship of the refined neutral lubricating oil. These agents make it possible to formulate lubricating oils having a broad range of viscosity such as those designated S.A.E. 10-30 W. which provide effective lubrication over a broad range of temperatures.

It has been found that the viscosity improvement deteriorates as the oil is subjected to shear during use. The result of this is that the viscosity of the used oil may have changed from the initial 10-30 W. to something near 5-10 W. Analyses of the oil indicate there has been mechanical degradation of the higher molecular weight molecules in the polymeric additive.

Various methods have been used in the past to improve the shear stability of lubricating oils containing polymers as viscosity index (VI) improvers. These prior methods typically involve a method of inducing degradation of the high molecular weight components by shearing a solution of the polymer. An agent which activates the polymer breakdown or which combines with the resulting polymer debris is sometimes used. Such methods have not been altogether satisfactory in that they require additional processing steps, minute solid particles eroded from the mills or other shearing equipment become entrained in the oil and the polymer debris and activator left in the oil interfere with the performance of the finished oil. Additionally, the very low molecular weight components originally present in the polymer remain as contaminants which are ineffective as VI improvers.

According to our invention, the viscosity loss caused by shear can be mitigated by the use of a polymer comprising molecules having a narrow range of molecular weights. This type of VI improver is effective initially at concentrations substantially the same as those used with the polymers having a broad distribution of molecular weights. Thus, the more easily decomposed high polymers and the accompanying decline in viscosity is substantially eliminated by using a polymer which does not contain the large molecules. Also the very low molecular weight polymers which do not aid the viscosity index and may produce undesirable effects are not introduced into the oil. This invention further overcomes the necessity to pretreat lubricating oils to destroy the unstable polymer molecules and eliminates the contamination of the lubricant by the polymer debris.

Polymers of numerous alkenyl compounds can be produced in narrow molecular weight distributions, however many of them are not suitable for the reason that either they are insoluble in the oil or they produce a high cloud point. Polymers which we have found to be effective in providing oils having a high viscosity index are those of nuclear substituted alkyl styrenes where the alkyl group contains from three to about eight carbon atoms. The high cloud point of oils containing polypropylstyrene may preclude the use of this additive in oils for cold weather operations. Styrene monomers substituted with an alkyl group having six to eight carbon atoms can be polymerized and used effectively according to this invention, however these substituted styrene monomers are not readily available owing to difficulties in avoiding thermal degradation during their production. The polymers having the larger alkyl groups, i.e. five or more carbon atoms, can be prepared more easily by alkylating a narrow range molecular weight polymer of styrene with the desired alkyl group in the presence of a Friedel-Crafts catalyst. Polymers of styrene substituted with an alkyl group having four or five carbon atoms are easily produced by anionic polymerization and provide high viscosity index oils at most service temperatures.

Tert.-butylstyrene is a particularly suitable monomer for the reasons that the tertiary carbon atom attached to the styrene nucleus presents an extremely stable compound and the polymer is highly soluble in hydrocarbon lubricating oils.

In addition to the homopolymers of alkylated styrene, copolymers of two or more alkylated styrenes or styrene can be used according to this invention, so long as the polymer contains a narrow range of molecular weights. Alkylated styrenes which are particularly suitable for producing homopolymers or copolymers are p-isopropyl styrene, isobutyl styrene, p-amyl styrene, p-hexyl styrene, p-heptyl styrene and p-octylstyrene. Monomers which can be copolymerized with these alkylated styrenes are styrene, $\alpha$-methyl styrene and vinyl toluene.

Monomeric alkyl substituted styrenes can be polymerized in the presence of an anionic catalyst such as n-butyl lithium to obtain a polymer having a narrow molecular weight distribution and a predetermined range of molecular weights. The preparation of this type of polymer from various vinylidene monomers and an anionic catalyst is taught in U.S. Patent 3,041,312, issued to Boyd. In addition to n-butyl lithium, other anionic catalysts which may be used to prepare these polymers are sodium $\alpha$-methylstyrene tetramer, sodium naphthalene complex and sodium biphenyl complex. The polymerization is carried out in the presence of a solvent such as benzene, tetrahydrofuran, dioxane and the alkane hydrocarbons. The reaction is customarily initiated at about room temperature then the temperature rises rapidly as polymerization occurs. The reaction is completed in a few minutes except in the case of very dilute solutions. The degree of polymerization or molecular weight of the polymer is directly proportional to the ratio of monomer to catalyst.

EXAMPLE 1

A narrow molecular weight distribution polymer of tert.-butylstyrene was prepared by adding 3 cc. of 0.25 N. n-butyl lithium in benzene to a solution of 1,000 cc. benzene and 100 cc. tert.-butylstyrene in a glass flask under a nitrogen atmosphere at room temperature. The monomer and catalyst solution was stirred as the catalyst was added. The solution was allowed to react for 3 hours then 0.3 cc. of water was added to destroy the catalyst. Thereafter, the polymer was precipitated by the addition of excess methanol then separated and dried in air.

This sample was shown to have a narrow molecular weight distribution by sedimentation velocity measurements in hexyl alcohol at 61° C. on the ultracentrifuge.

A commercial 100 SUS neutral lubricating oil containing 2.4 weight percent of the above poly-tert.-butylstyrene had a viscosity of 10.5 centistokes at 210° F. (corresponding to S.A.E. 30 weight). A typical commercial polymethacrylate VI improvement additive produces the same viscosity when present at a concentration of 3.4 weight percent in the same oil base. Viscosity loss on shear at 210° F. was only 12.2 percent with the oil containing poly-tert.-butylstyrene and 29.1 percent with the commercial polymethacrylate additive.

Shear degradation was determined according to the proposed ASTM test for determining the shear stability of polymer-containing lubricating oils.

Other homopolymers and copolymers having a narrow range of molecular weights were prepared with an anionic catalyst and using the procedure followed in Example 1. The polymers were evaluated as lubricant additives by mixing with a commercial 100 SUS neutral oil. The properties of these lubricating oils are given in Table 1.

TABLE 1

| Sample No. | Polymer Composition, Wt. Percent | Intrinsic Viscosity, $\eta$ | Polymer Content, Wt. Percent | Viscosity cs. at 210° F. | Viscosity Index | Viscosity Loss Sonic Shear, Percent |
| --- | --- | --- | --- | --- | --- | --- |
| 1 | 100% t-BS | 0.66 | 2.4 | 10.5 | 144 | 12.2 |
| 2 | 100% i-PS | 0.36 | 6.0 | 10.97 | 143 | 4.1 |
| 3 | 100% i-PS | 0.48 | 6.0 | 11.02 | 143 | 3.7 |
| 4 | 100% i-PS | 0.56 | 4.2 | 11.46 | 145 | 7.1 |
| 5 | 100% p-AS | 0.39 | 4.0 | 10.09 | 144 | 9.0 |
| 6 | 100% p-OS | 0.38 | 4.0 | 10.42 | 144 | 13.4 |
| 7 | 90% t-BS; 10% S | 0.57 | 3.5 | 10.10 | 144 | 1.5 |
| 8 | 80% t-BS; 20% S | 0.60 | 5.0 | 11.88 | 143 | 3.8 |
| 9 | 75% t-BS; 25% S | 0.52 | 4.0 | 10.34 | 144 | 4.8 |
| 10 | 90% t-BS; 10% VT | 0.80 | 3.5 | 10.64 | 144 | 8.2 |
| 11 | 70% t-BS; 30% VT | 0.67 | 3.2 | 10.71 | 148 | 9.6 |
| 12 | 60% t-BS; 40% VT | 0.71 | 3.6 | 10.66 | 148 | 9.5 |
| 13 | 84% t-BS; 16% AMS | 1.01 | 3.15 | 10.71 | 145 | 12.1 |
| 14 | Alkylated polystyrene | 0.84 | 3.35 | 10.71 | 145 | 9.0 | t-BS = tert.-Butylstyrene.
i-PS = Isopropylstyrene.
p-AS = p-Amylstyrene.
p-OS = p-Octylstyrene.
S = Styrene.
AMS = α-Methylstyrene.
VT = Vinyl toluene.

The data presented in Table 1 clearly illustrate the utility of these alkylated styrene polymers and copolymers as VI improvers which undergo substantially less degradation upon being sheared than do polymers having a broader spectrum of molecular weights. These samples were prepared using sufficient polymer to obtain the desired viscosity at 210° F., i.e. corresponding to S.A.E. 30 W. The intrinsic viscosity correlates directly with the average molecular weight of a given polymer system. Thus, samples 2, 3 and 4 containing poly-isopropylstyrene utilize polymers having different average molecular weights. The greater shear susceptibility of sample 4 containing the highest molecular weight polymer. Samples 7, 8 and 9 illustrate the use of a copolymer of styrene and an alkylated styrene. The intrinsic viscosities of these samples reflect not only the difference in average molecular weight but also the difference in the concentration of comonomer. Samples 10, 11 and 12 illustrate the properties of the tert.-butylstyrene-vinyl toluene copolymer. This copolymer produces a solution in neutral lubricating oil having cloud point below room temperature at polymer compositions containing over 40 weight percent of the vinyl toluene whereas copolymers of tert.-butylstyrene and styrene have cloud points at about room temperature where the copolymer contains no more than about 30 weight percent of styrene.

EXAMPLE 2

A styrene homopolymer having an average molecular weight of 153,000 which was polymerized in the presence of an anionic catalyst was dissolved in ortho dichlorobenzene to produce a 10 percent by weight solution. A reaction flask was charged with 150 grams of the polymer solution then, while stirring, 15 grams of nitrobenzene, 3 grams of anhydrous AlCl₃ and 0.10 gram of water were added to the flask. After warming the flask and its contents to 40° C. isobutylene was sparged in at a rate of 1.3 liters per hour. The temperature increased as the reaction proceeded and was held at 48° C. while isobutylene was added for 3⅔ hours. At this time 50 cc. of a 10 percent aqueous solution of hydrochloric acid was added to the reactor and stirred until the color of the mixture changed from dark red to brown. The mixture was washed with water and the polymer precipitated from the organic layer with methanol then washed and dried to constant weight at 55° C. This polymer appears in Table 1 as Sample No. 14.

FIGURE 1 is a plot of percent viscosity loss under shear against the average molecular weight of poly-tert.-butylstyrene polymerized in the presence of an anionic catalyst.

Figure 2:
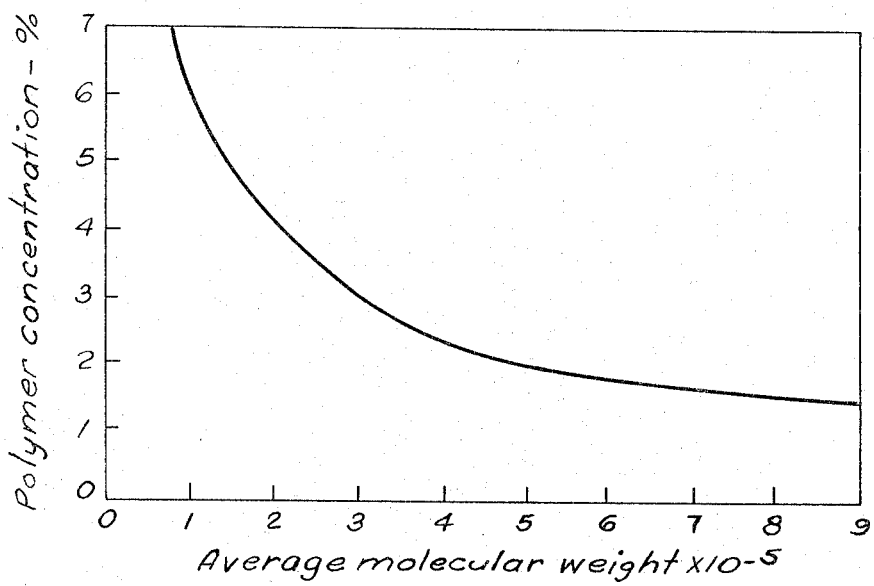

FIGURE 2 correlates the weight percent concentration of poly-tert.-butylstyrene with the average molecular weight of the polymer which is necessary to increase the viscosity of a commercial 100 SUS neutral oil to 10.5 centistokes at 210° F. which corresponds to S.A.E. 30 weight oil. This correlation is applicable to both the narrow distribution polymers of tert.-butylstyrene prepared with an anionic catalyst and to the broad distribution polymers prepared with a free radical catalyst such as dicumyl peroxide. For example, 100 SUS neutral oil containing 4 weight percent of poly-tert.-butylstyrene having an average molecular weight of about 200,000 will have a viscosity of 10.5 centistokes at 210° F. regardless of the molecular weight distribution of the polymer. The low viscosity loss of oils containing the anionic polymer when subjected to shear greatly enhances the viscosity index (VI) of used oils.

Referring to FIGURE 1 it can be seen that the lower molecular weight polymers undergo the least viscosity loss, however FIGURE 2 shows these low molecular weight polymers must be used in high concentration to obtain S.A.E. 30 weight oil. Therefore, it is preferred to use polymers having an average molecular weight between about 200,000 and 600,000 at a polymer concentration of 4 weight percent or less so that viscosity loss will not exceed about 20 percent.

These polymers do not dissolve readily in lubricating oil stocks, therefore it is common practice to prepare concentrated solutions of the polymer in the refined neutral oil for addition to oil stocks. The copolymers containing styrene, α-methyl styrene or vinyl toluene as well as the homopolymers of the lower alkyl styrene have cloud points at about room temperature at concentrations of about 10 to 30 weight percent whereas the homopolymers of the higher alkyl styrenes can be dissolved in concentrations up to 40 or 50 weight percent without increasing the cloud point to a temperature above room temperature. Accordingly, these VI improver polymers may be dissolved first in a small amount of the refined neutral lubricating oil and this concentrated solution added to additional lubricating oil stocks along with other additives commonly used in lubricating oils.

These lubricating oils having enhanced viscosity indexes are particularly suitable for use as automotive engine lubricants, automatic transmission fluids, differential and gear case lubricants and in similar lubrication duties in industrial equipment.

We claim:

1. A high viscosity index lubricating oil comprising a refined neutral lubricating oil and an effective amount of a narrow range molecular weight styrene polymer having an average molecular weight between 200,000 and 600,000 dissolved therein as a viscosity index improver, said polymer containing at least 60 weight percent of a nuclear substituted alkyl styrene wherein said alkyl group contains from about 3 to about 8 carbon atoms and no more than about 40 weight percent of a styrene compound selected from the group consisting of styrene, α-methyl styrene and vinyl toluene, said polymer being produced by polymerizing said styrene in the presence of an anionic polymerization catalyst.

2. A lubricating oil according to claim 1 wherein said alkyl styrene is tert.-butylstyrene.

3. A lubricating oil according to claim 2 wherein said polymer contains substantially 100 weight percent of said tert.-butylstyrene.

4. A lubricating oil according to claim 1 wherein said nuclear substituted alkyl styrene is isopropylstyrene.

5. A lubricating oil according to claim 1 wherein said nuclear substituted alkyl styrene is p-amylstyrene.

6. A lubricating oil according to claim 1 wherein said nuclear substituted alkyl styrene is p-octylstyrene.

7. A lubricating oil according to claim 1 wherein said polymer consists of about 75 to about 90 weight percent of tert.-butylstyrene and from about 25 to about 10 weight percent of styrene.

8. A lubricating oil according to claim 1 wherein said polymer consists of about 60 to about 90 weight percent of tert.-butylstyrene and from about 40 to about 10 weight percent of vinyl toluene.

9. A lubricating oil according to claim 1 wherein said polymer consists of at least 84 weight percent of tert.-butylstyrene and no more than about 16 weight percent of α-methylstyrene.

10. A lubricating oil according to claim 1 wherein said anionic polymerization catalyst is n-butyl lithium.

11. A viscosity index improver for lubricating oils comprising as essential ingredients thereof a solution of a refined neutral lubricating oil substantially saturated at room temperature with a styrene polymer having an average molecular weight between 200,000 and 600,000 and containing at least 60 weight percent of a nuclear substituted alkyl styrene wherein said alkyl group contains from about 3 to about 8 carbon atoms and no more than about 40 weight percent of a styrene compound selected from the group consisting of styrene, α-methyl styrene and vinyl toluene, said polymer being produced by polymerizing said styrenes in the presence of an anionic polymerization catalyst.

12. A viscosity index improver according to claim 11 wherein said nuclear substituted alkyl styrene is tert.-butylstyrene.

13. A viscosity index improver according to claim 11 wherein said nuclear substituted alkyl styrene is isopropylstyrene.

14. A viscosity index improver according to claim 11 wherein said nuclear substituted alkyl styrene is p-amylstyrene.

15. A viscosity index improver according to claim 11 wherein said nuclear substituted alkyl styrene is p-octylstyrene.

16. A lubricating oil according to claim 1 wherein said nuclear substituted alkyl styrene is produced by first polymerizing styrene in the presence of an anionic polymerization catalyst then alkylating the resulting polymer in the presence of a Friedel-Crafts catalyst.

17. A lubricating oil according to claim 16 wherein said polystyrene is alkylated with isobutylene in the presence of anhydrous $AlCl_3$.

18. A viscosity index improver according to claim 11 wherein said nuclear substituted alkyl styrene is produced by first polymerizing styrene in the presence of an anionic polymerization catalyst then alkylating the resulting polystyrene in the presence of a Friedel-Crafts catalyst.

19. A viscosity index improver according to claim 18 wherein said polystyrene is alkylated with isobutylene in the presence of a Friedel-Crafts catalyst.

References Cited by the Examiner

UNITED STATES PATENTS

| | | | |
|---|---|---|---|
| 2,569,400 | 9/1951 | Butler | 252—59 |
| 3,041,312 | 6/1962 | Boyd | 260—95 X |
| 3,076,791 | 2/1963 | Hollyday et al. | 252—59 X |

FOREIGN PATENTS

| | | |
|---|---|---|
| 589,434 | 6/1947 | Great Britain. |
| 608,854 | 9/1948 | Great Britain. |
| 688,082 | 2/1953 | Great Britain. |
| 710,699 | 6/1954 | Great Britain. |

DANIEL E. WYMAN, *Primary Examiner.*

W. H. CANNON, *Assistant Examiner.*